(12) United States Patent
Barker

(10) Patent No.: US 10,284,103 B2
(45) Date of Patent: May 7, 2019

(54) POWER CONVERTER OPERABLE DURING A FAULT CONDITION

(71) Applicant: GENERAL ELECTRIC TECHNOLOGY GmbH, Baden (CH)

(72) Inventor: Carl David Barker, Stone (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/907,226

(22) PCT Filed: Jul. 24, 2014

(86) PCT No.: PCT/EP2014/065980
§ 371 (c)(1),
(2) Date: Jan. 22, 2016

(87) PCT Pub. No.: WO2015/011249
PCT Pub. Date: Jan. 29, 2015

(65) Prior Publication Data
US 2016/0172990 A1    Jun. 16, 2016

(30) Foreign Application Priority Data

Jul. 25, 2013   (EP) ..................................... 13177961

(51) Int. Cl.
*H02M 5/42*       (2006.01)
*H02M 1/32*       (2007.01)
*H02M 7/483*      (2007.01)

(52) U.S. Cl.
CPC ............... *H02M 5/42* (2013.01); *H02M 1/32* (2013.01); *H02M 7/483* (2013.01); *H02M 2007/4835* (2013.01)

(58) Field of Classification Search
CPC ................... H02M 1/32; H02M 7/483; H02M 2007/4835; H02M 5/42
See application file for complete search history.

(56) References Cited

U.S. PATENT DOCUMENTS 5,687,049 A * 11/1997 Mangtani ................ H02M 1/32
                                                            361/18
6,069,806 A *  5/2000 Lenz ................. H02M 3/33561
                                                            363/67

(Continued)

FOREIGN PATENT DOCUMENTS

CN         103141018 A      6/2013
EP         2 602 927        6/2013

(Continued)

OTHER PUBLICATIONS

Aredes, M. et al., "A 24-MW Soft-Switching HVDC Tap for ±500-kV Transmission Lines," IEEE Transactions on Power Delivery, IEEE Service Centre, New York, NY, US, vol. 19, No. 4, Oct. 1, 2004 (pp. 1835-1842).

(Continued)

*Primary Examiner* — Jue Zhang
*Assistant Examiner* — Lakaisha Jackson
(74) *Attorney, Agent, or Firm* — GE Global Patent Operation; Scott R. Stanley

(57) ABSTRACT

A power converter includes first and second DC terminals between which the power converter is operable to generate a voltage difference. The power converter also includes a control unit that is configured to operate in a normal mode during normal operation of the power converter and in a fault mode when a fault occurs in a respective DC power transmission medium that is operatively connected in use to one of the first or second DC terminals. The control unit in the normal mode generates a normal operating voltage difference between the first and second DC terminals. The control unit in the fault mode generates a modified operating voltage difference between the first and second DC terminals while maintaining the respective voltage potential with respect to earth of the other of the first and second DC (Continued)

terminals. The modified operating voltage difference is lower than the normal operating voltage difference.

11 Claims, 5 Drawing Sheets

(56) References Cited

U.S. PATENT DOCUMENTS

| | | |
|---|---|---|
| 2012/0120691 A1 | 5/2012 | Armschat et al. |
| 2013/0193766 A1* | 8/2013 | Irwin .................... H02H 7/268 |
| | | 307/82 |
| 2013/0308235 A1* | 11/2013 | Davies ................ H02H 1/1257 |
| | | 361/62 |

FOREIGN PATENT DOCUMENTS

| | | |
|---|---|---|
| WO | WO-2007/084040 A1 | 7/2007 |
| WO | WO-2010/069371 A1 | 6/2010 |
| WO | WO-2011/050847 A1 | 5/2011 |
| WO | WO-2011/124260 | 10/2011 |
| WO | WO-2012/103936 A1 | 8/2012 |
| WO | WO-2015/024950 A1 | 2/2015 |

OTHER PUBLICATIONS

International Search Report and Written Opinion for International Application No. PCT/EP2014/065980, dated Nov. 10, 2014, 10 pages.

First Office Action and Search issued in connection with corresponding CN application No. 201480052919.3 dated Sep. 11, 2017.

* cited by examiner

POWER CONVERTER OPERABLE DURING A FAULT CONDITION

CROSS-REFERENCE TO RELATED APPLICATIONS

This present application is a 371 U.S. National Application of International Application No. PCT/EP2014/065980, entitled "A POWER CONVERTER," filed Jul. 24, 2014, which claims the benefit of and priority to European Application No. 13177961, entitled "A POWER CONVERTER," filed Jul. 25, 2013, which is incorporated herein by reference in its entirety.

This invention relates to a power converter for use in a high voltage power transmission network, and to a transmission network including a plurality of the such power converters.

In power transmission networks alternating current (AC) power is converted to direct current (DC) power for transmission via overhead lines and/or under-sea cables. This conversion removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance.

DC power may also be converted to DC power, e.g. when different parts of a transmission network operate at different voltages.

In each instance a power converter provides the required conversion.

According to a first aspect of the invention there is provided a power converter, for use in a high voltage power transmission network, comprising:

first and second DC terminals between which the power converter is operable to generate a voltage difference; and a control unit operatively connected with the power converter and configured to operate in a normal mode during normal operation of the power converter and in a fault mode when a fault occurs in a respective DC power transmission medium operatively connected in use to one of the first or second DC terminals, the control unit in the normal mode generating a normal operating voltage difference between the first and second DC terminals with each of the first and second DC terminals having a respective positive or negative voltage potential with respect to earth, and the control unit in the fault mode generating a modified operating voltage difference between the first and second DC terminals while maintaining the respective voltage potential with respect to earth of the other of the first and second DC terminals, the modified operating voltage difference being lower than the normal operating voltage difference to control the level of voltage experienced by a respective DC power transmission medium operatively connected in use to the other of the first and second DC terminals.

The ability of the power converter to control the level of voltage experienced by a respective DC power transmission medium operatively connected in use to the other of the first and second DC terminals, i.e. the level of voltage experienced by a 'healthy' DC power transmission medium not effected by the occurrence of a fault, allows the power converter to accommodate a fault in one or other of first and second DC power transmission mediums without the need for there to be an increase in the insulation rating of the said terminals and power transmission medium (which would increase considerably the cost of manufacturing and installing an associated power converter), or the need to in use temporarily disconnect the DC terminals from the corresponding DC power transmission medium (which would result in a total cessation of power transmission through the DC power transmission mediums and any further elements of a transmission network connected thereto).

As such the power converter of the invention is able to continue to transmit power when a fault occurs in an associated DC power transmission medium without the need for significant capital investment in increased insulation.

In a preferred embodiment of the invention the power converter includes at least one converter limb, the or each converter limb including series-connected first and second modules, each of the modules including at least one switching element and at least one energy storage device, the or each switching element and the or each energy storage device in each module combining to selectively provide a voltage source.

The inclusion of one or more such converter limbs having such series-connected first and second modules allows the power converter to generate a wide range of voltage differences between the first and second DC terminals, e.g. so as to facilitate the transfer of power between AC and DC networks.

Preferably the or each second module is additionally configured to selectively permit the addition of its voltage source to or the subtraction of its voltage source from the voltage difference provided by the or each first module.

The inclusion in the power converter of one or more such second modules allows the control unit to alter rapidly the voltage difference generated between the first and second DC terminals of the power converter, e.g. in response to a fault occurring in one or other of an associated DC power transmission medium.

Optionally the control unit in the normal mode is configured to add the voltage source of at least one second module to the voltage difference provided by the or each first module, and the control module in the fault mode is configured to subtract the voltage source of at least one second module from the voltage difference provided by the or each first module.

Such a control unit is able rapidly to provide a required reduction in the voltage difference between the first and second DC terminals in order to, for example, prevent a DC power transmission medium associated with one or other of the DC terminals being exposed to an excessive voltage which might otherwise damage or destroy it.

In another preferred embodiment of the invention the control unit generates a modified operating voltage difference that is one of:

(a) a predetermined voltage difference based on pre-fault operating conditions of the power converter; and (b) the normal operating voltage difference reduced by a predetermined safety factor.

Such a feature of the control unit assists in achieving a new steady-state operating mode for the power converter, despite the occurrence of a fault, and thereby allows the power converter of the invention to continue transferring power.

The control unit in the fault mode may generate a modified operating voltage difference to limit the level of voltage experienced by the respective DC power transmission medium operatively connected in use to the other of the first and second DC terminals to that experienced by the said DC power transmission medium during normal operation of the power converter.

Such an arrangement helps to ensure, e.g. in the case of a fault in one DC power transmission medium leading to the transmission medium being short-circuited to earth, i.e. zero volts, that the maximum voltage potential experienced by the other power transmission medium does not exceed a desired threshold, e.g. as provided for by the insulating rating of the other power transmission medium required to accommodate normal operation of the power converter.

In another preferred embodiment of the invention the control unit is additionally configured to monitor the voltage of at least one of the first and second DC terminals, and to initiate operation in its fault mode when the monitored voltage at one of the first and second DC terminals rises above or falls below a predetermined threshold.

The inclusion of such a control unit allows the power converter of the invention to detect when a fault has occurred in one or other of first and second DC power transmission medium that in use are connected thereto, and to respond automatically to such a fault, e.g. without the need to rely on the receipt of an instruction from a distant control module which may need to be transmitted via an unreliable communication medium.

According to a second aspect of the invention there is provided a power transmission network comprising first and second power converters as described hereinabove, the first DC terminals of each power converter being operatively interconnected by a first DC power transmission medium, and the second DC terminals of each power converter being operatively interconnected by a second DC power transmission medium, the control units of the first and second power converters being configured to cooperate with one another in a normal mode during normal operation of the power transmission network and to cooperate with one another in a fault mode when a fault occurs in one of the DC power transmission mediums operatively connected to one of the first and second DC terminals of each respective power converter, the control units in the normal mode cooperating with one another to generate an identical normal operating voltage difference between the first and second DC terminals of each respective power converter with each of the first and second DC terminals of each respective power converter having a respective positive or negative voltage potential with respect to earth, and the control units in the fault mode cooperating with one another to generate an identical modified operating voltage difference between the first and second DC terminals of each respective power converter while maintaining the respective voltage potential with respect to earth of the other of the first and second DC terminals of each respective power converter, the modified operating voltage difference being lower than the normal operating voltage difference to control the level of voltage experienced by the other DC power transmission medium.

Such a power transmission network is able to continue to transmit at least a portion of the power transmitted between the first and second power converters during their normal operation, even when a fault occurs, and without the need for capital investment in increased insulation for each of the first and second power converters and the DC power transmission mediums.

Optionally the control units in the fault mode are configured to further cooperate with one another to maintain the rate of change of the voltage difference between the first and second terminals of one power converter within a predetermined range of the rate of change of the voltage difference between the first and second DC terminals of the other power converter.

Such further cooperation between the control units helps to avoid a rapid swing in power flow between the first and second power converters, such as might arise if one power converter responded more rapidly than the other to a fault.

Preferably the power transmission network additionally includes one or more further power converters operatively connected with the said first and second power converters, and a controller configured to coordinate the operation of each power converter, wherein following the generation of a modified operating voltage difference between the first and second DC terminals of each of the first and second power converters the controller determines the available power flow through the network and reconfigures the operation of the or each further power converter according to the determined available power flow.

The inclusion of such a controller allows the network to make use of any spare current carrying capability, i.e. power transfer capability, within the or each further power converter, so as to maximise the available power flow through the network despite a restriction in power flow between the first and second power converters because of a fault in one of the power transmission medium extending therebetween.

There now follows a brief description of preferred embodiments of the invention, by way of non-limiting example, with reference to the following figures in which.

Figure 1:
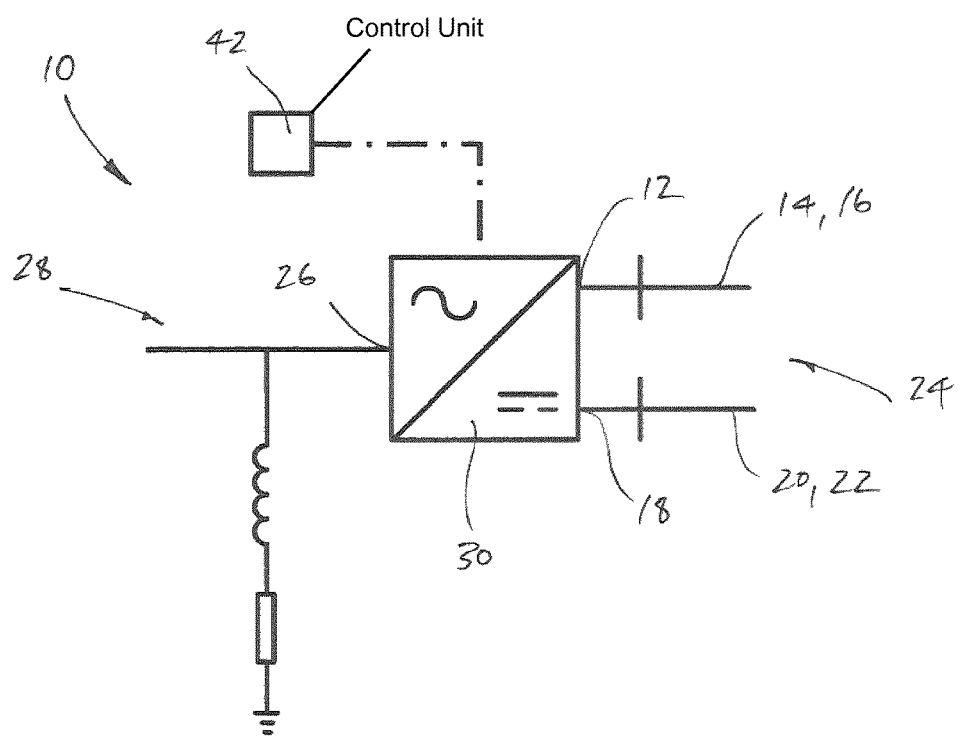
FIG. 1 shows a schematic view of a power converter according to a first embodiment of the invention.

A power converter according to a first embodiment of the invention is designated generally by reference numeral 10.

The power converter 10 includes a first DC terminal 12 that, in use, is operatively connected to a first DC power transmission medium 14 which, in the embodiment shown is a first DC transmission cable 16. The power converter 10 also includes a second DC terminal 18 that is operatively connected in use to a second DC power transmission medium 20 in the form of a second DC transmission cable 22. Each of the first and second DC transmission cables form part of a DC network 24.

In addition the power converter 10 shown in FIG. 1 includes an AC terminal 26 which, in use, is connected to an AC network 28.

Figure 2:
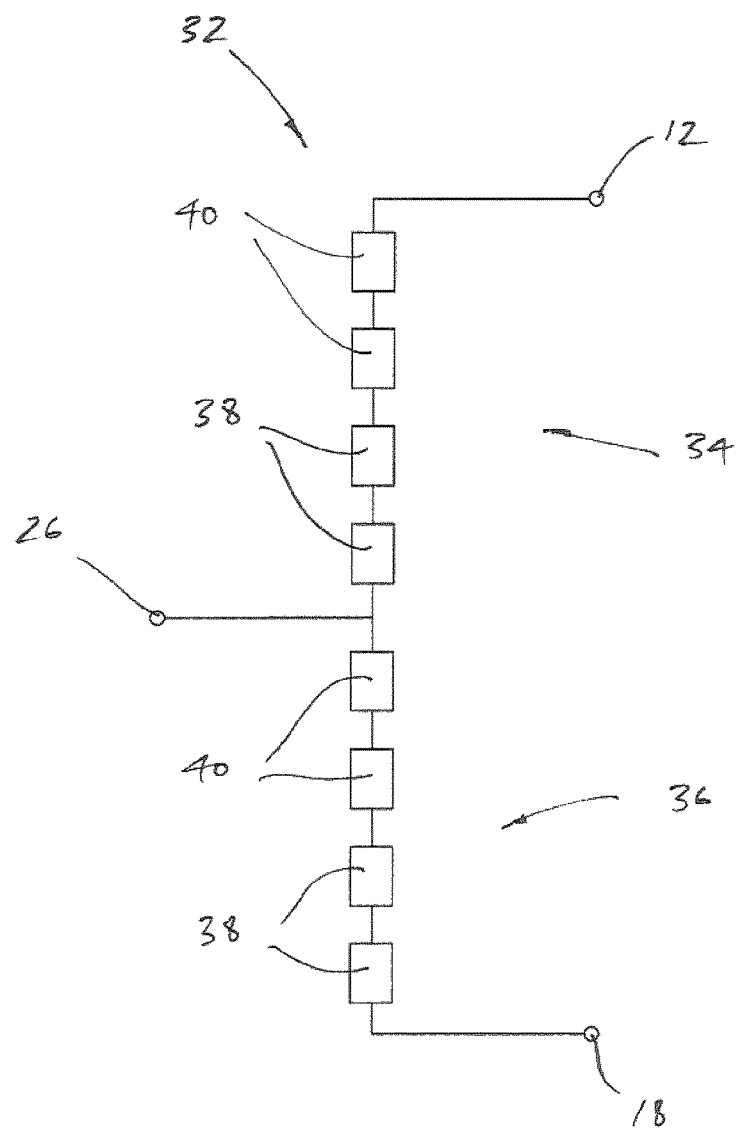
FIG. 2 shows a schematic view of a converter limb within the power converter shown in FIG. 1.

More particularly, the power converter 10 shown in FIG. 1 defines an AC/DC voltage source converter 30 which includes a converter limb 32 that is arranged as shown in FIG. 2.

The converter limb 32 extends between the first and second DC terminals 12, 18 and includes a first limb portion 34 that extends between the first DC terminal 12 and the AC terminal 26, and a second limb portion 36 which extends between the second DC terminal 18 and the AC terminal.

Each limb portion 34, 36 includes a plurality of series-connected first and second modules 38, 40, and more particularly each limb portion 34, 36 includes two first modules 38 and two second modules 40. In other embodiments of the invention (not shown) each limb portion 34, 36, and indeed the converter limb 32 as a whole, may include fewer than or more than two of one or more of the first and second modules 38, 40.

In still further embodiments of the invention (not shown) each limb portion 34, 36 may include at least one additional device connected in series with the or each first and second modules 38, 40. The or each such additional device may be or include a valve reactor such as, for example, an inductor.

In the specific embodiment shown, each first module 38 of the voltage source converter 30 includes a pair of switching elements that are connected in parallel with an energy storage device in a half-bridge arrangement to define a 2-quadrant unipolar module that can provide a zero or positive voltage source and can conduct current in two directions.

Each second module 40 includes two pairs of switching elements which are connected in parallel with an energy storage device in a full-bridge arrangement to define a 4-quadrant bipolar module that can provide a negative, zero or positive voltage source and can conduct current in two directions. In this manner the voltage source of each of the second modules 40 can be either added to the voltage difference provided by the first modules 38 or it can be subtracted from the voltage difference provided by the first modules 38.

In other embodiments of the invention (not shown) the voltage source converter 30 may include more than one converter limb 32, and in particular may include three converter limbs each of which is associated with a respective phase of a three phase AC network.

In still further embodiments of the invention the power converter 10 may define a DC/DC converter which is operable to generate a modified operating voltage difference between respective first and second DC terminals on one side thereof, irrespective of the DC voltage interconnected with the other side of the DC/DC converter.

In addition to the foregoing the power converter 10, i.e. the voltage source converter 30, includes a control unit 42 which is operatively connected therewith.

Figure 3A:
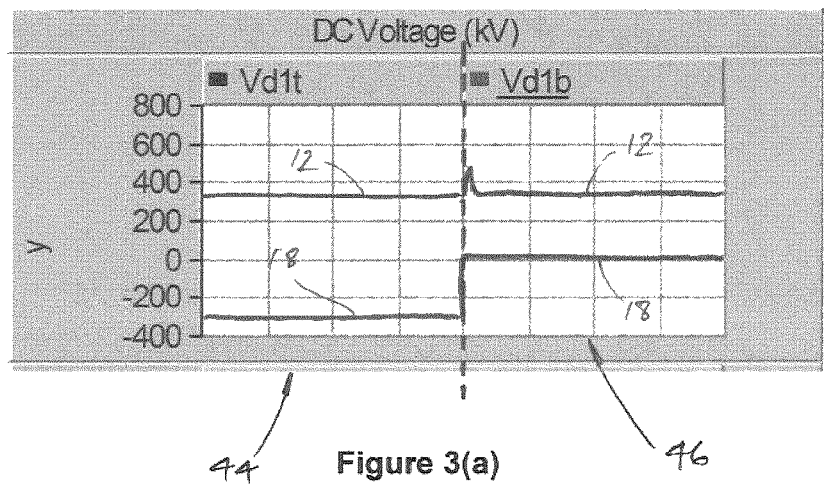
FIG. 3(a) illustrates the impact the generation of a modified operating voltage difference has on the voltage experienced by a DC power transmission medium associated with the power converter shown in FIG. 1 when a fault occurs.

The control unit 42 is configured to operate in a normal mode 44 (as shown in the left hand side of FIG. 3(a)) during normal operation of the power converter 10, i.e. when there is no fault in either of the DC transmission cables 16, 22. The control unit 42 is also configured to operate in a fault mode 46 (as shown in the right hand side of FIG. 3(a)) when a fault occurs in one of the first or second DC transmission cables 16, 22, e.g. a short-circuit to earth occurs in one or other of the DC transmission cables 16, 22.

When operating in the normal mode 44, the control unit 42 generates a normal operating voltage difference, e.g. of approximately 640 kV, between the first and second DC terminals 12, 18 with each of the first and second DC terminals 12, 18 having a respective positive or negative voltage potential with respect to earth.

The control unit 42 generates such a normal operating voltage difference by causing the power converter 10 to set the first DC terminal 12 to operate at a first normal operating voltage, e.g. +320 kV, and the second DC terminal 18 to operate at a second normal operating voltage, e.g. −320 kV, as shown in FIG. 3(a). More particularly the control unit 42 directs each second module 40 in the first limb portion 34 to add its voltage source to the voltage difference provided by the first modules 38 in the first limb portion 34 to generate +320 kV at the first DC terminal 12, while the control unit 42 directs each second module 40 in the second limb portion 36 to add its voltage source to the voltage difference provided by the first modules 38 in the second limb portion 36 to generate −320 kV at the second DC terminal 18.

Under such conditions, although the normal operating voltage difference between the first and second DC terminals 12, 18 is 640 kV, the voltage potential with respect to earth at each of the first and second DC terminals 12, 18, is only 320 kV, and so each of the respective DC power transmission medium 14, 20, i.e. the DC transmission cables 16, 22, experiences a voltage level of only 320 kV. Thus the installation requirements for each of the DC transmission cables 16, 22 may be determined according to this level of voltage exposure.

In other embodiments of the invention (not shown) the control unit 42 while generating a given normal operating voltage difference between the first and second DC terminals 12, 18, may be configured to set the first and second DC terminals 12, 18 to operate at respective first and second normal operating voltages that are different to those set out above, and more particularly are not necessarily arranged symmetrically either side of earth, i.e. zero volts. In this regard the control unit 42 in such embodiments may not direct each and every second module 40 to add its voltage source to that of one or more of the first modules 38.

When operating in the fault mode 46 the control unit 42 generates a modified operating voltage difference between the first and second DC terminals 12, 18 that is lower than the normal operating voltage difference while maintaining the respective voltage potential with respect to earth of the other of the first and second DC terminals 12, 18.

More particularly in the event of, e.g. the second DC transmission cable 22 short-circuiting to earth and drawing the second DC terminal 18 to zero volts, the control unit 42 is configured to reduce the voltage difference between the first and second DC terminals 12, 18 to a modified operating voltage difference, e.g. of 320 kV, which is lower than the normal operating voltage difference, e.g. of 640 kV.

The control unit 42 achieves such a reduction in the voltage difference by directing one of the second modules 40 in each of the first and second limb portions 34, 36 to subtract its voltage source from the voltage difference provided by the first modules 38 in the corresponding limb portion 34, 36 so as to only to generate a voltage difference of 320 kV between the first and second DC terminals 12, 18. In other embodiments of the invention the control unit may direct different combinations of first and second modules 38, 40 to cancel one another out, or for one or more first and second modules 38, 40 to instead provide a zero voltage source.

In the foregoing manner the control unit 42 generates a modified operative voltage difference that is equivalent to the normal operating voltage difference reduced by a safety factor of 2.

In other embodiments of the invention the safety factor may be less than or more than 2.

The control unit 42 may also, in other embodiments of the invention, generate a modified operating voltage difference based on one or more pre-fault operating conditions of the power converter 10.

In the embodiment shown, the generation of a modified operating voltage difference of 320 kV that is half the normal operating voltage difference of 640 kV, means that when a fault occurs the voltage potential with respect to earth of the first DC terminal 12 remains at 320 kV, as shown in the right hand side of FIG. 3(a). As a result the first DC power transmission medium 14, i.e. the first DC transmission cable 16 continues to be exposed to a voltage level of only 320 kV, i.e. a voltage level which is the same as that it experiences during normal operation of the power converter 10. There is, therefore, no requirement for a costly increase in the insulation requirements of the first DC transmission cable 16.

The control unit 42 is configured to operate in essentially the same manner in the event of a fault on the first DC transmission cable 16, i.e. so as to maintain the level of voltage exposure of the second DC transmission cable 22 to the same as that it sees during normal operation of the power converter 10.

Figure 3B:
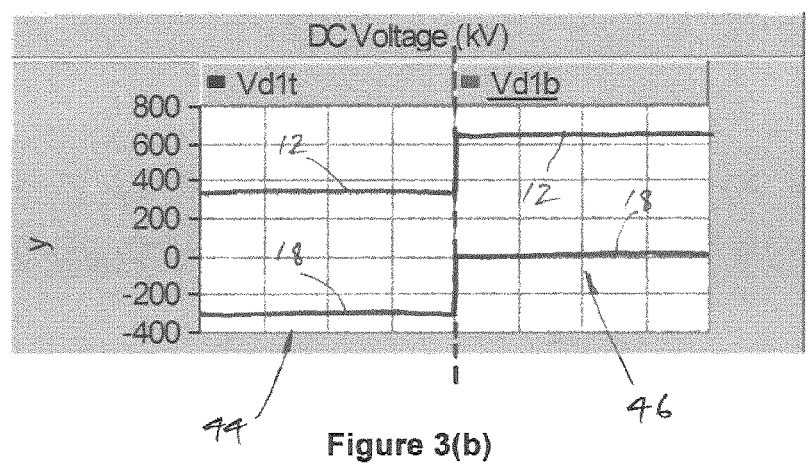
FIG. 3(b) illustrates the voltage experienced by a DC power transmission medium associated with a conventional power converter when a fault occurs.
Figure 4:
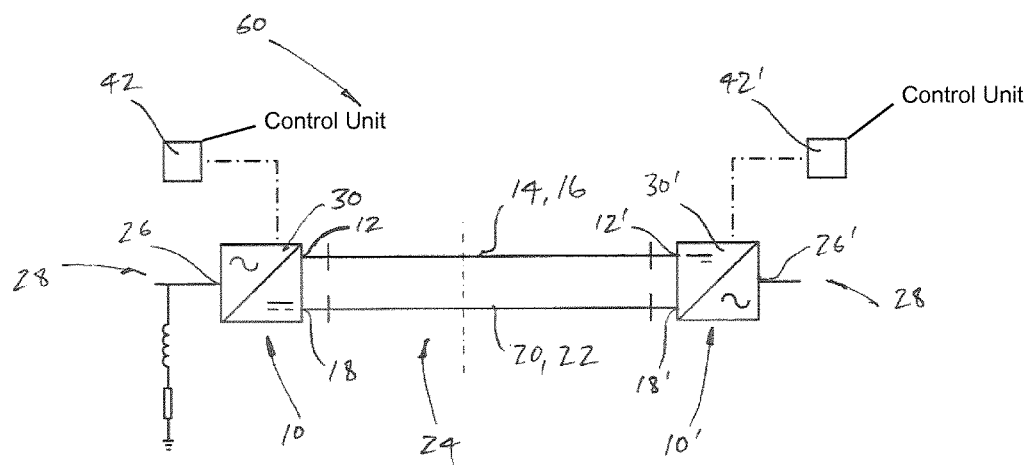
FIG. 4 shows a power transmission network according to a second embodiment of the invention.

In contrast in a conventional voltage source converter, which does not include a control unit that is configured to intervene in the manner of the invention in the event of a fault occurring, the voltage difference between the first and second DC terminals 12, 18 remains at the same magnitude as during normal operation of the converter, e.g. at 640 kV. As a result, in the event of a similar short-circuit fault occurring in the second DC transmission cable 22 and the second DC terminal 18 again being drawn to zero volts, the first DC terminal and the first DC transmission cable 16 operatively connected therewith experiences a very rapid increase in voltage level from 320 kV to the full converter voltage, i.e. the full voltage difference between the first and second DC terminals 12, 18, e.g. +640 kV, as illustrated schematically in the right hand side of FIG. 3(b).

Such a voltage potential is much higher than the insulation rating of the second DC transmission cable 22 and any equipment connected to it, and so without some form of intervention, e.g. disconnection of the first and second DC terminals (and the resulting undesirable interruption in power transfer), damage to the second DC transmission cable 22 will almost certainly occur.

Returning to the embodiment shown in FIG. 1, the control unit 42 is additionally configured to monitor the voltage of at least one of the first and second DC terminals 12, 18, and to initiate operation in its fault mode when the monitored voltage at one of the first and second DC terminals rises above or falls below a predetermined threshold.

In this regard, the voltage at a given DC terminal 12, 18 will fall if a fault occurs in the DC power transmission medium 14, 20 connected thereto, while the voltage will rise if a fault occurs in the DC power transmission medium 14, 20 connected to the other DC terminal 12, 18.

In the foregoing manner the control unit of the invention is able automatically to carry out the aforementioned remedial steps as it operates in the fault mode to control, and in particular limit, the level of voltage experienced by a healthy DC power transmission medium 14, 20 in the event that a fault occurs in the other DC power transmission medium 14, 20.

A power transmission network according to a second embodiment of the invention is designated generally by reference numeral 60.

The power transmission network includes first and second power converters 10, 10' as described herein above. The first DC terminals 12, 12' of each power converter 10, 10' are operatively interconnected by a first DC power transmission medium 14 and the second DC terminals 18, 18' of each power converter 10, 10' are operatively interconnected by a second DC power transmission medium 20.

The control units 42, 42' of the first and second power converters 10, 10' are configured to cooperate with one another in a normal mode during normal operation of the power transmission network and to cooperate with one another in a fault mode when a fault occurs in one of the DC power transmission mediums 14, 20 operatively connected to one of the first and second DC terminals 12, 12', 18, 18' of each respective power converter 10, 10'.

In this regard, each of the first and second control units 42, 42' are configured to operate in essentially the same manner as described hereinabove with respect to the first power converter 10.

In the normal mode the control units 42, 42' cooperate with one another to generate an identical normal operating voltage difference, e.g. 640 kV, between the first and second DC terminals 12, 12', 18, 18' of each respective power converter 10, 10' with each of the first and second DC terminals 12, 12', 18, 18' of each respective power converter 10, 10' having a respective positive or negative voltage potential, e.g. +320 kV or −320 kV, with respect to earth.

Meanwhile, the control units 42, 42' in the fault mode cooperate with one another to generate an identical modified operating voltage difference, e.g. 320 kV, between the first and second DC terminals 12, 12' 18, 18' of each respective power converter 10, 10' while maintaining the respective voltage potential with respect to earth of the other of the first and second DC terminals 12, 12' 18, 18' of each respective power converter 10, 10'. The modified operating voltage difference is lower than the normal operating voltage difference and thereby allows the power transmission network 60 to control the level of voltage experienced by one of the DC power transmission medium 14, 20 in the event of a fault occurring in the other of the DC power transmission medium 14, 20.

In addition to the foregoing the control units 42, 42' in the fault mode are configured to further cooperate with one another to maintain the rate of change of the voltage difference between the first and second terminals 12, 12', 18, 18' of one power converter 10, 10' within a predetermined range of the rate of change of the voltage difference between the first and second DC terminals 12, 12', 18, 18' of the other power converter 10, 10'.

Figure 5:
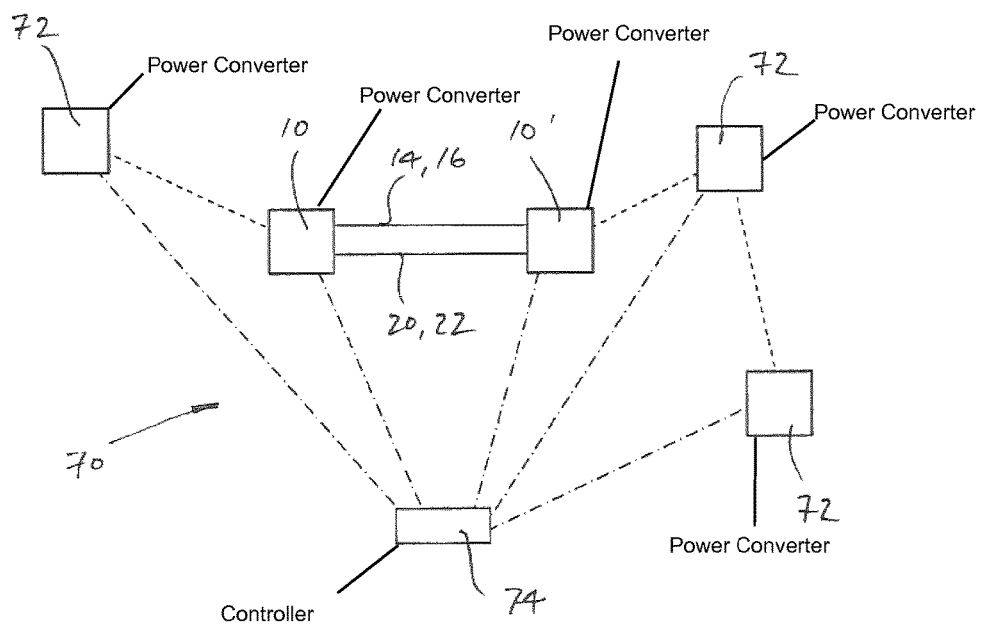
FIG. 5 shows a power transmission network according to a third embodiment of the invention.

A power transmission network 70 according to a third embodiment of the invention is illustrated schematically in FIG. 5.

The second power transmission network 70 is similar to the first power transmission network 60 and like features share the same reference numerals.

The second power transmission network 70 additionally includes three further power converters 72, which are operatively connected with first and second power converters 10' 10 that are interconnected by first and second DC power transmission medium 14, 20.

The second power transmission network 70 also includes a controller 74 that is configured to coordinate the operation of each power converter 10, 10', 72.

In use, following the generation of a modified operating voltage difference between the respective first and second DC terminals 12, 12', 18, 18' of each of the first and second power converters 10, 10', the controller 74 determines the available power flow through the network 70 and reconfigures the operation of each further power converter 72 according to the determined available power flow.

The invention claimed is:

1. A power converter, for use in a high voltage power transmission network, comprising:

first and second DC terminals between which the power converter is operable to generate a voltage difference; and a control unit operatively connected with the power converter and configured to operate in a normal mode during normal operation of the power converter and in a fault mode when a fault occurs in a respective DC power transmission medium operatively connected in use to one of the first or second DC terminals, the control unit in the normal mode generating a normal operating voltage difference between the first and second DC terminals with each of the first and second DC terminals having a respective positive or negative voltage potential with respect to earth, and the control unit in the fault mode generating a modified operating voltage difference between the first and second DC terminals while maintaining a respective voltage potential with respect to earth of the other of the first and second DC terminals, the modified operating voltage difference being lower than the normal operating voltage difference to control a level of voltage experienced by a respective DC power transmission medium operatively connected in use to the other of the first and second DC terminals, the modified operating voltage difference being a predetermined voltage difference based on pre-fault operating conditions of the power converter.

2. The power converter according to claim 1 including at least one converter limb, the at least one converter limb including series-connected first and second modules, each of the first and second modules including at least one switching element and at least one energy storage device, the at least one switching element and the at least one energy storage device in the first and second modules combining to selectively provide a voltage source.

3. The power converter according to claim 2 wherein each second module is additionally configured to selectively permit addition of the voltage source to or subtraction of the voltage source from a voltage difference provided by each first module.

4. The power converter according to claim 3 wherein the control unit in the normal mode is configured to add the voltage source of the second module to the voltage difference provided by the first module, and the control unit in the fault mode is configured to subtract the voltage source of the second module from the voltage difference provided by the first module.

5. The power converter according to claim 1 wherein the control unit further generates a modified operating voltage difference that is the normal operating voltage difference reduced by a predetermined safety factor.

6. The power converter according to claim 1 wherein the control unit in the fault mode generates a modified operating voltage difference to limit the level of voltage experienced by the respective DC power transmission medium operatively connected in use to the other of the first and second DC terminals to that experienced by the respective DC power transmission medium during normal operation of the power converter.

7. The power converter according to claim 1 wherein the control unit is additionally configured to monitor a voltage of at least one of the first and second DC terminals, and to initiate operation in the fault mode when the monitored voltage at one of the first and second DC terminals rises above or falls below a predetermined threshold.

8. A power transmission network comprising first and second power converters, each of the first and second power converters comprising:

first and second DC terminals between which the first and second power converters are operable to generate a voltage difference; and a control unit operatively connected with the first and second power converters and configured to operate in a normal mode during normal operation of the first and second power converters and in a fault mode when a fault occurs in a respective DC power transmission medium operatively connected in use to one of the first or second DC terminals, the control unit in the normal mode generating a normal operating voltage difference between the first and second DC terminals with each of the first and second DC terminals having a respective positive or negative voltage potential with respect to earth, and the control unit in the fault mode generating a modified operating voltage difference between the first and second DC terminals while maintaining a respective voltage potential with respect to earth of the other of the first and second DC terminals, the modified operating voltage difference being lower than the normal operating voltage difference to control a level of voltage experienced by a respective DC power transmission medium operatively connected in use to the other of the first and second DC terminals, the modified operating voltage difference being a predetermined voltage difference based on pre-fault operating conditions of the first and second power converters.

9. The power transmission network according to claim 8, wherein:

the first DC terminals of the first and second power converters are operatively interconnected by a first DC power transmission medium, and the second DC terminals of the first and second power converters are operatively interconnected by a second DC power transmission medium, the control unit of the first and second power converters are configured to cooperate with one another in a normal mode during normal operation of the power transmission network and to cooperate with one another in a fault mode when a fault occurs in one of the first and second DC power transmission mediums operatively connected to one of the first and second DC terminals of the first and second power converters, the control unit in the normal mode cooperate with one another to generate an identical normal operating voltage difference between the first and second DC terminals of the first and second power converters with each of the first and second DC terminals of the first and second power converters having a respective positive or negative voltage potential with respect to earth, and the control unit in the fault mode cooperate with one another to generate an identical modified operating voltage difference between the first and second DC terminals of the first and second power converters while maintaining the respective voltage potential with respect to earth of the other of the first and second DC terminals of the first and second power converters, the modified operating voltage difference being lower than the normal operating voltage difference to control the level of voltage experienced by the other of the first and second DC power transmission mediums.

10. The power transmission network according to claim 9 additionally including one or more further power converters operatively connected with the first and second power converters, and a controller configured to coordinate an operation of the first and second power converters, wherein following the generation of a modified operating voltage difference between the first and second DC terminals of each of the first and second power converters the controller determines an available power flow through the power transmission network and reconfigures the operation of the one or more further power converter according to the determined available power flow.

11. The power transmission network according to claim 9 wherein the control unit in the fault mode are configured to further cooperate with one another to maintain a rate of change of the voltage difference between the first and second terminals of one of the first and second power converters within a predetermined range of the rate of change of the voltage difference between the first and second DC terminals of the other of the first and second power converters.

\* \* \* \* \*